J. Armstrong Jr. 2. Sheets, Sheet 1.

Corn Planter.

No. 3695. Reissued Nov. 2. 1869.

Plate 1

Witnesses.
R. Campbell
Julius Hirsch

Inventor.
Jas. Armstrong Jr.
by
Mann. Skinrich & Lauman.

J. Armstrong, Jr.,

2. Sheets, Sheet 2.

Corn Planter.

No. 3695. Reissued Nov. 2. 1869.

Witnesses

R. H. Mansfield

Julius Hirsch

Inventor

Jas. Armstrong Jr.

by

Munn & Co.

UNITED STATES PATENT OFFICE.

JAMES ARMSTRONG, JR., OF ELMIRA, ILLINOIS.

IMPROVEMENT IN CORN-PLANTERS.

Specification forming part of Letters Patent No. 44,273, dated September 20, 1864: Reissue No. 3,695, dated November 2, 1869.

*To all whom it may concern:*

Be it known that I, JAMES ARMSTRONG, Jr., of Elmira, in the county of Stark and State of Illinois, have invented a new and Improved Corn-Planter; and I do hereby declare that the following is a full, clear, and exact description thereof, reference being had to the accompanying drawings, making part of this specification, in which—

Figure 1:
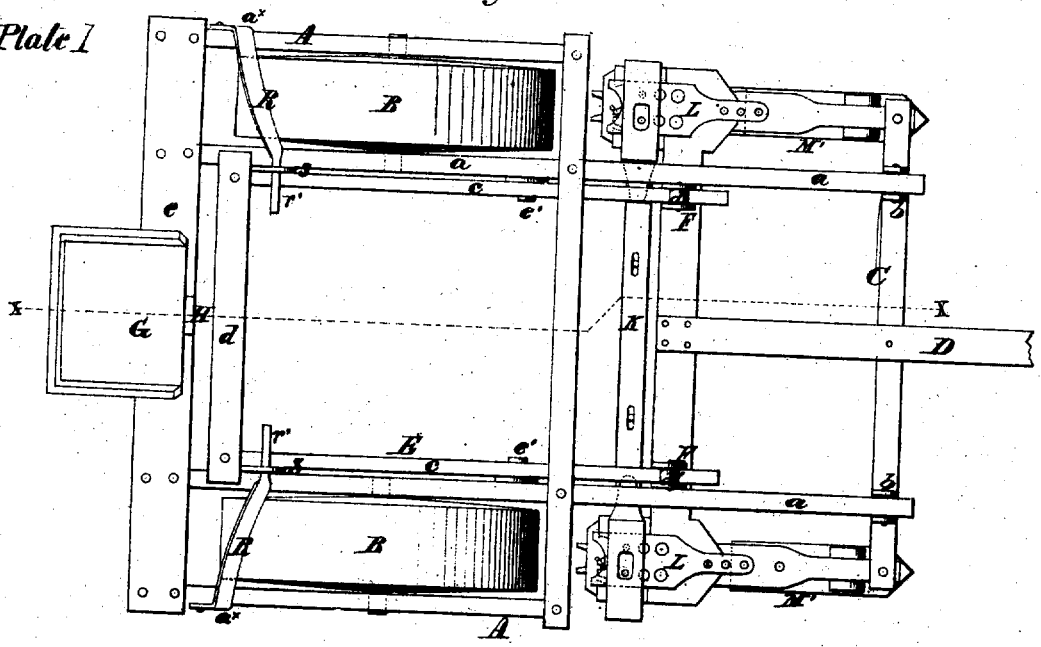
Figure 2:
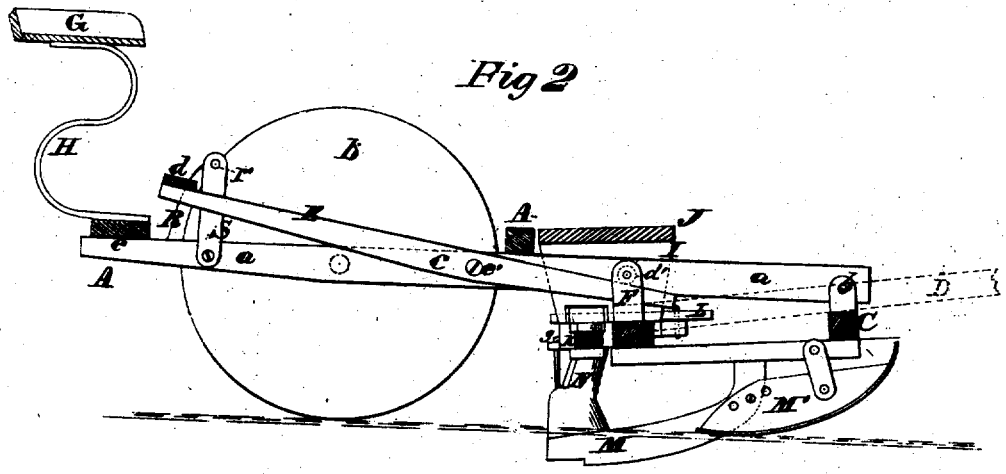
Figure 3:
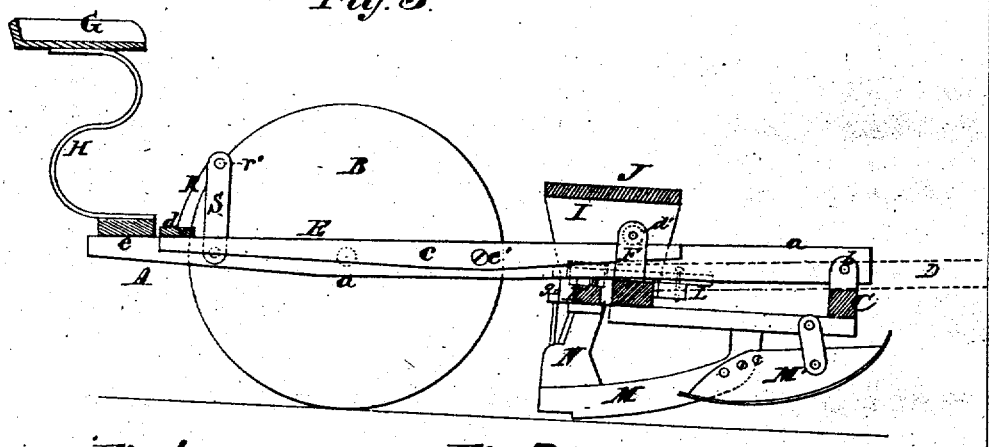
Figure 4:
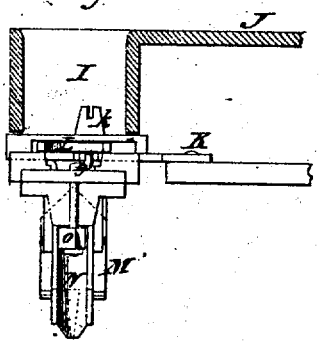
Figure 5:
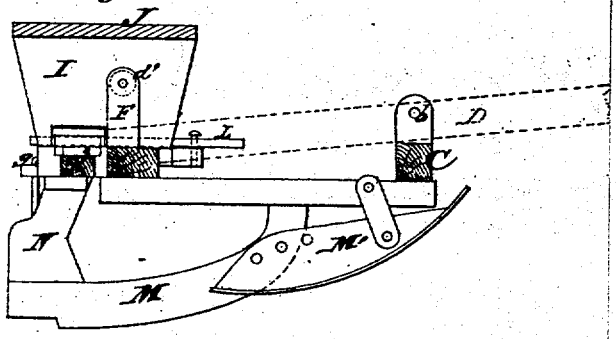
Figure 6:
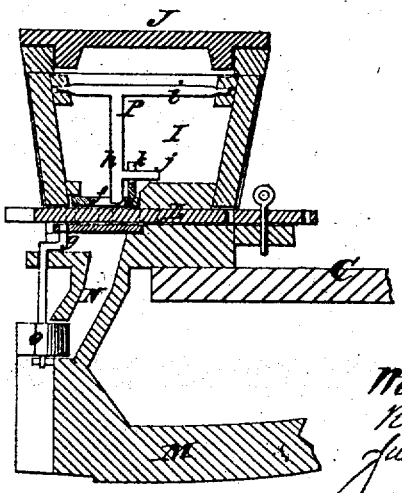

Figure 1, Plate 1, is a plan view of the machine, with the seed-hoppers, their connecting-board, and the hand-lever for working the seed-slide, when planting in hills, removed. Fig. 2, Plate 1, is a section taken longitudinally through the machine, as indicated by dotted lines *x x* in Fig. 1, indicating the position of the parts while planting. Fig. 3, Plate 2, is a similar view of the same parts shown in Fig. 2, indicating the front frame and seeding devices elevated free from the ground. Fig. 4, Plate 2, is a sectional view taken vertically through one of the seed-hoppers and a rear view of one of the cutters, its shoe, and the seed-dropping devices. Fig. 5, Plate 2, is an inside elevation of one of the shoes, its cutter, and the seed-dropping devices. Fig. 6 is an enlarged longitudinal section taken vertically through the seed-dropping devices on one side of the machine.

Similar letters of reference indicate corresponding parts in the several figures.

This invention relates to certain novel improvements on machines which are designed for planting corn either in hills or drills, whereby the frame to which the seed dropping devices and the openers are applied, together with the rear end of the draft-pole, is allowed to have movements independent of the main transporting-frame, and whereby a person located upon the main frame can raise or depress the front or secondary frame at pleasure.

The nature of my invention consists, first, in pivoting the front end of the secondary frame, which carries the shoes, the cutters, and the seed-dropping devices, and which has the draft-pole rigidly attached to it, to the front end of the main transporting-frame, and in employing a treadle-frame upon the main frame in such manner that while the shoes and cutters are allowed to accommodate themselves to the inequalities of surface passed over the attendant while riding on the main frame can raise or depress the secondary frame at pleasure, as will be hereinafter explained; secondly, in suspending the rear part of the pivoted secondary frame from the front ends of a treadle-frame, which is pivoted to the main frame by means of loops and anti-friction rollers, as will be hereinafter explained; thirdly, in hanging seed-stirrers within the seed-hoppers, so that the lower ends of the stirrers shall vibrate in a direction with the length of the seed-slide, and in connecting such stirrers directly to this slide, so that they will be operated by it, as will be hereinafter explained.

To enable others skilled in the art to understand my invention, I will explain its construction and operation.

In the accompanying drawings, A represents the main transporting-frame, which is of rectangular form, and is supported by the middle of its length by two transporting-wheels having axles which do not extend entirely across said frame. The frame A is provided with two longitudinal bars, *a a*, which extend some distance in front of the front transverse bar, and to which is attached by pivots *b b* and short standards the front end of the secondary frame C, which latter is also of rectangular form, as shown in the drawings, and to which the draft-pole D is rigidly secured. It will be seen by reference to Fig. 1 that the draft-pole is secured to the two transverse bars of the secondary frame C, so that the pivotal connections *b b* serve in common for this frame C and draft-pole D.

F represents a treadle-frame, which is composed of two parallel levers, *c c*, connected at their back ends by a transverse foot-board, *d*. The levers *c c* extend back nearly to the rear cross-bar, *e*, of the main frame A, and these levers are pivoted to the side bars of the frame A at *e′ e′*, which are points in front of the axles of wheels B. The front ends of the levers *c c* pass freely through loops F F, which rise from and are rigidly secured to the rear cross-bar of secondary frame C, and which are provided with anti-friction rollers *d′ d′*, that rest or roll upon said levers. By these means the rear part of the secondary frame, when elevated, is suspended from the front arms of the levers *c c*, as shown in Fig. 3.

The driver's seat G is mounted upon a curved metal support, H, rising from and secured to the rear cross-bar, *e*, of the main frame A, and is thus located to relieve the front part of this frame from the weight of the driver and to place him in a convenient position for depressing the rear part of the treadle-frame when he desires to raise the secondary frame free from the ground.

I I represent seed-boxes, which are placed on the back part of the secondary frame C, one at each side, and which are connected by a seat-board, J, on which a person sits while dropping seed in hills. There should be a hand-lever (not shown in the drawings) passed through the seat board J for working the seed-slide.

K is the seed-slide, the ends of which pass through the lower parts of the seed-boxes, and are mortised or slotted horizontally and transversely to receive through them the perforated stationary plates L, which have positions at right angles to the slide, and which are longitudinally adjustable for the purpose of bringing holes of different sizes beneath the holes *f* through the upper portions of the slide for regulating the quantity of seed to be dropped. Beneath each one of the perforated plates L two holes are made through the lower portion of the slide for allowing the seed to drop from the seed-cells into the tube N beneath at each stroke of the slide.

In my Letters Patent numbered 35,914 I have fully described the perforated plates L and perforated mortised seed-slide, and I refer to this patent for a full description of the construction and operation thereof.

M represents the furrow-markers or colters, which are attached at their front ends to the longitudinal side bars of the secondary frame C and at their rear ends to the shoes at the lower ends of the seed-tubes N. In front of each colter M, and connected to each one of the said side bars of the secondary frame C by links, is a runner, M′, which is adjustably connected at its rear end to the front end of its colter M, and which is intended to run upon the ground, gage the depth of the colter in the ground, and also relieve the necks of the horses from the weight of the machine, as fully described in my Letters Patent numbered 35,914, above referred to.

Near the lower ends of each tube N an oscillating valve, O, is arranged, which is designed for discharging the seed from the said tube into the furrow, and which receives an oscillating motion from the seed-slide K through the medium of a rod, which has a crank, *g*, upon its upper end. This feature is also fully described in my Letters Patent No. 35,914.

In each seed box or hopper I there is placed a stirrer, P, consisting of a pendent rod, *h*, the lower end of which just enters the hole *f* in the slide K, and the upper end of which is attached to a horizontal bar, *i*, whose ends are fitted loosely into bearings at the front and back of the seed-box, as clearly shown in Fig. 6. Near the lower end of the pendent rod *h* is an offset, *j*, which is received by a notch in an upright portion, *k*, on the slide K.

From this description it will be seen that the stirrer in each seed-box is operated with a vibrating motion by the slide K, and the holes *f* in this slide, as well as the perforations through the plates L, are prevented from being clogged with seed or foreign substances.

R R represent scrapers, which are pivoted at $a^{\times}$ to the main frame A and passed through pivoted standards S S. The scrapers R have inclined positions, and, when necessary, the attendant can cause their lower edges to scrape the peripheries of the wheels B by pressing with his feet upon the inner extensions of these scrapers.

I employ a secondary frame, C, in conjunction with the main transporting-frame A, to which secondary frame the rear end of the draft-pole is rigidly secured, so as to rise and fall with it. I also pivot the front end of the secondary frame to two forward extensions of the main frame, which extensions are inside of the hoppers, the runners, and the seed-dropping devices, and I suspend from a lifting-frame the rear part of the secondary frame, so that the latter, with its furrow-makers and shoes, can be conveniently raised free from the ground by an attendant upon the main frame.

Having described my invention, what I claim as new, and desire to secure by Letters Patent, is—

1. The secondary frame C, hinged or pivoted at points in front of its seed-hoppers to extensions *a a* of the main draft-frame A, and having rigidly secured to it the draft-pole D, in combination with a lifting-frame, E, substantially as and for the purposes described.

2. The arrangement, with reference to the main frame A, of the draft-pole D, rigidly secured to the pivoted frame C, substantially as and for the purpose herein set forth.

3. The anti-friction rollers *d d*, applied to loops F, in combination with treadle-frame E, as and for the purposes specified.

4. Stirrers P, when hung so as to be operated by slide K, substantially as set forth.

JAMES ARMSTRONG, JR.

Witnesses:

RUFUS P. PARRISH,

JNO. PRICE.